United States Patent [19]
Thiesen

[11] 3,820,194
[45] June 28, 1974

[54] CUTTING DEVICE FOR LARGE PIECES OF SOFT FOODSTUFFS

[76] Inventor: Josef Jakob Thiesen, Kyffhauserstrasse 35/37, D-5 Cologne, Germany

[22] Filed: Nov. 13, 1972

[21] Appl. No.: 305,953

[30] Foreign Application Priority Data
Nov. 15, 1971 Germany............................ 2156631

[52] U.S. Cl......................... 17/32, 83/160, 100/95, 100/218, 425/296
[51] Int. Cl.............................................. A22c 7/00
[58] Field of Search............. 83/112, 113, 147, 160, 83/404.1; 425/289, 296, 352, 253, 444; 17/32; 100/95, 218

[56] References Cited
UNITED STATES PATENTS

| | | | |
|---|---|---|---|
| 1,957,623 | 5/1934 | Walter.............................. | 83/115 X |
| 3,101,761 | 8/1963 | Buehler et al...................... | 17/32 X |
| 3,565,297 | 2/1971 | Bladt et al......................... | 100/218 X |
| 3,720,980 | 3/1973 | Gehlen et al........................... | 17/32 |

*Primary Examiner*—Willie G. Abercrombie
*Attorney, Agent, or Firm*—Michael S. Striker

[57] ABSTRACT

The outlet of a feed hopper communicates with a chamber located beneath it. Along one side of the chamber extends a channel having an open outlet end and being open to the chamber. From the other side a plunger is movable towards the channel so as to push food which has entered through the outlet, transversely of the chamber and into the channel. A cutter blade is movable along the open side of the channel so as to sever the food in the channel from the food in the chamber, and a pusher element can move in the channel longitudinally thereof for pushing the severed food out of the open end of the channel.

11 Claims, 7 Drawing Figures

CUTTING DEVICE FOR LARGE PIECES OF SOFT FOODSTUFFS

BACKGROUND OF THE INVENTION

The present invention relates generally to cutting devices, and in particular to cutting devices for large pieces of soft foodstuffs, such as meat, bacon or the like.

There are many applications where soft foodstuffs initially come to hand in large piece and must then be severed into smaller pieces. This is true, for instance, in abattoirs, supermarkets having meat departments and similar installations, where for instance large pieces of meat or bacon must be cut into smaller pieces. Especially if the cutting is to be in form of cubes, strips or the like it is highly desirable that the final pieces resulting after the cutting be as uniform as possible. Heretofore it was not possible to achieve the desired degree of uniformity because it was necessary to first subdivide a large piece of meat, bacon or the like into smaller pieces which subsequently were fed into a cutting device to be cubed, sliced, cut into strips of the like. Although the cutting device itself is capable of providing the desired degree of uniformity, it is necessary that the cutting device be fed with chunks of meat or the like which themselves are not uniform, because the larger piece of meat from which they have been cut has had to be subdivided manually. Evidently, when a large piece of meat is cut into smaller chunks by hand, uniformity of cutting is very difficult to attain, if at all possible. A further problem is that soft foodstuffs of the type here in question are relatively sensitive to pressure, that is they must not be squeezed too strongly because this disadvantageously influences the final quality of the product.

SUMMARY OF THE INVENTION

It is therefore a general object of the present invention to overcome the disadvantages of the prior art.

More particularly it is an object of the invention to provide an improved cutting device for large pieces of soft foodstuffs, such as meat, bacon and the like, which avoids these disadvantages.

Still more particularly it is an object of the invention to provide such an improved cutting device which permits the subdividing of large pieces of soft foodstuffs into smaller chunks, sized so that these smaller chunks can then be fed to another cutting devices in which they are given their final subdivided form, whether it be cubes, strips, slices or the like.

Still a further object of the invention is to provide such an improved cutting device which assures that the foodstuffs are not subjected to undesirably high pressures during cutting, so as to avoid disadvantageous consequences in terms of the quality of the foodstuff.

In keeping with these objects, and of others which will become apparent hereafter, one feature of the invention resides in a cutting device for large pieces of soft foodstuffs, such as meat, which briefly stated comprises wall means defining a chamber having a top, two transversely spaced sides, and a discharge channel extending along one of these sides in open communication with the chamber. A feed hopper is located above the chamber and has an outlet communicating with the top thereof. A first pusher element is mounted for movement beneath the outlet from the region of the other of these sides of the chamber towards the one side, so as to push foodstuffs admitted through the outlet into the channel. A cutter blade is movable into and out of position alongside the channel so as to sever the foodstuff in the latter from the foodstuff in the chamber. A second pusher element is movable in the channel longitudinally thereof for ejecting foodstuff from the channel.

It is advantageous if the exposed contact face of the first pusher element is inclined upwardly and forwardly because this assures that as the pusher element moves across the chamber to push the foodstuffs into the channel, the foodstuffs are engaged more reliably in the chamber.

A further concept of the invention provides for this free contact face to be provided on a plate having an upper edge which has secured to it a sheet material member which slidingly contacts the under side of an edge of the hopper bounding the outlet opening thereof. This means that a simple and inexpensive construction has been found for closing off the outlet opening of the hopper as the slide or pusher element moves across the chamber, which assures that no foodstuffs can fall out of the hopper into the chamber behind the pusher element as the same advances towards the channel.

It is also advantageous if the two pusher elements are each provided with a separate fluid-operated drive, advantageously with separated hydraulic drives. It is furthermore desirable to mount in the respective hydraulic circuit an overpressure valve which assures that the hydraulic forces effecting advancement of the respective pusher element cannot exceed a preset value to thereby prevent excessive pressure upon the foodstuffs and damaging thereof, such as by bruising, squeezing or the like.

A particularly simple construction of the invention is obtained if the bottom wall of the chamber which is located downwardly spaced from the top thereof, is rectangular and if the outlet opening of the hopper is also rectangular and has approximately the same cross-sectional area or size as the bottom wall.

With respect to the cutter blade I have found it to be especially advantageous if the latter is so constructed that when it is in cutting position alongside the channel, it completely closes off the latter from the chamber. This means that it replaces the sidewall of the channel which is missing at the side facing the interior of the chamber. If the cutter blade remains in position while the second pusher element is operated to expel severed foodstuff from the channel, it serves to afford both the foodstuff and the second pusher element a reliable and accurate guidance, preventing in particular any escape of the severed foodstuff into the chamber and thus making it possible to retract the first pusher element during the period during which the second pusher element is operated to expel foodstuff from the channel.

In many applications it will be desirable that the cutter device operate as automatically as possible. In this context it is advantageous if the cutter blade is a circular blade which is driven in rotation by an appropriate motor and can be moved in a vertical plane. The blade can of course be mounted so that it can be moved from a higher position vertically to its lower position, or vice versa, and it is advantageously mounted in a carriage which performs such movement.

However, it is also possible to configurate the cutter blade as a semi-circular plate and to mount it pivotably about a pivot axis, providing at least one semi-circular edge of the plate with a cutting edge.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
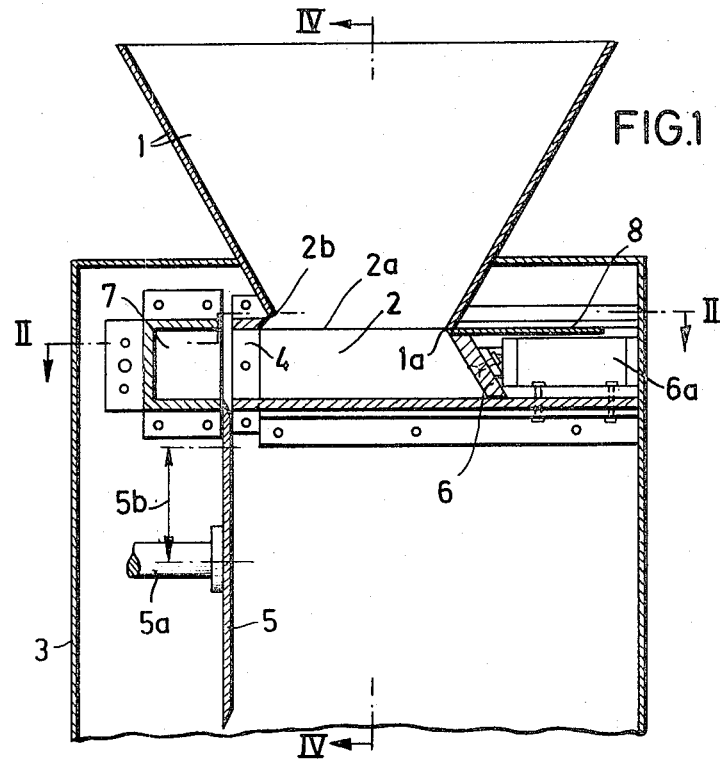
FIG. 1 is a section taken on line I—I of FIG. 2, showing the first pusher element in its starting or retracted position.

Discussing the drawing and firstly the embodiment illustrated in FIGS. 1-4 it will be seen that reference numeral 1 designates a feed hopper into which large pieces of foodstuffs, such as meat, bacon or the like, are admitted. The hopper 1 has an outlet opening 2a which is advantageously of rectangular outline and which is large in its cross-sectional area. The outlet opening 2a communicates with the inlet opening at the top of a chamber 2 which is located beneath the hopper 1 and which is advantageously also of rectangular outline, being so dimensioned that large pieces of foodstuffs can enter into it from the hopper 1. In cross section the chamber 2 is essentially of U-shaped configuration.

Figure 3:
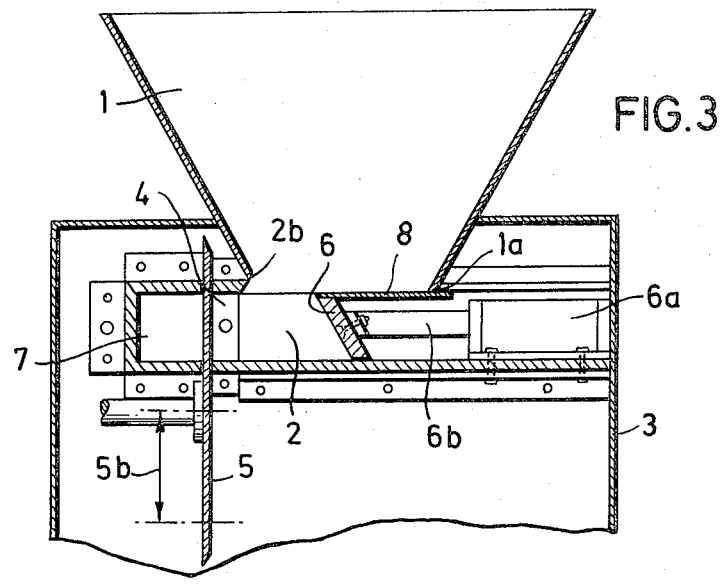
FIG. 3 is a view similar to FIG. 1 but showing the first pusher element and the cutter blade in their end positions.

Reference numeral 6 designates a first pusher element which can be moved across the chamber 2 from one side towards the other, and FIG. 3 shows that the element 6 is displaceable over a part only of the length of the chamber 2. The free contact face of the element 6 is forwardly and upwardly inclined as seen in the direction of the advancing stroke. FIGS. 1 and 3 show that the upper edge of this contact face is located farther forwardly than the lower edge, as seen in the direction of the working stroke. Advantageously this free contact face is provided on a plate and preferably the upper edge of the plate has a horizontal sheet metal member 8 secured to it, that is a member 8 which extends in the direction in which the member 6 can be moved. The member 8 engages the underside of the edge 1a of the right-hand side wall (see FIGS. 1 and 3) of the hopper 1 in sliding contact therewith. It serves as a closure for the outlet opening of the hopper 1 when the element 6 moves. Advantageously the plate is connected via a rod 6b with a hydraulic drive 6a which is known per se and essentially consists of a hydraulic cylinder and a piston displaceable longitudinally therein and connected with the rod 6b. In addition to the hydraulic circuit which is necessary for operating the drive and thereby the member 6, it is advantageous if an overpressure valve is incorporated in the hydraulic circuit which can be made adjustable so as to make it possible to select and limit the maximum pressure that can be exerted by the member 6 upon foodstuffs.

It has already been pointed out that the outline of the bottom wall of the chamber 2 is advantageously rectangular, although this need not be so. In any case, it is desirable that the outlet opening 2a of the hopper 1 (and therefore the inlet opening of the chamber 2) be as large in cross-sectional area (or at least approximately so) as the bottom wall of the chamber 2.

Figure 2:
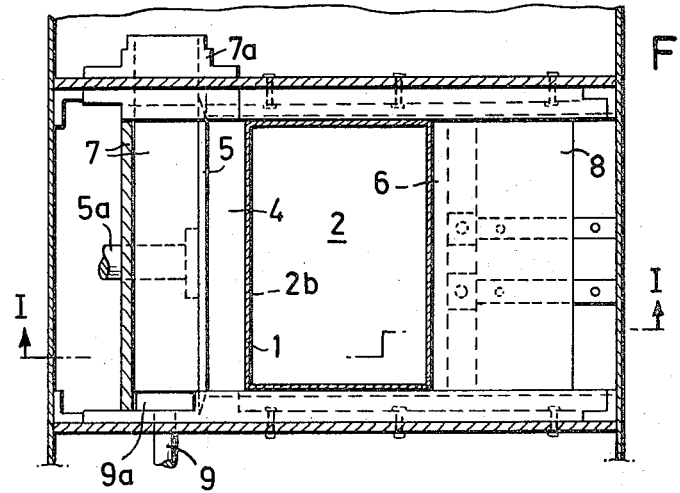
FIG. 2 is a section taken on line II—II of FIG. 1.

Extending along that side of the chamber 2 which is spaced from the pusher element 6 is a frame-shaped intermediate element 4 which serves to secure a channel 7 one side of which is open towards the chamber 2 so as to communicate with the same. This is clearly shown in the drawing and the channel 7 is advantageously of rectangular or quadratic cross section. FIG. 2 shows that its length corresponds approximately to the width of the chamber 2 and the channel 7 will have an open end through which foodstuffs can be expelled.

Figure 4:
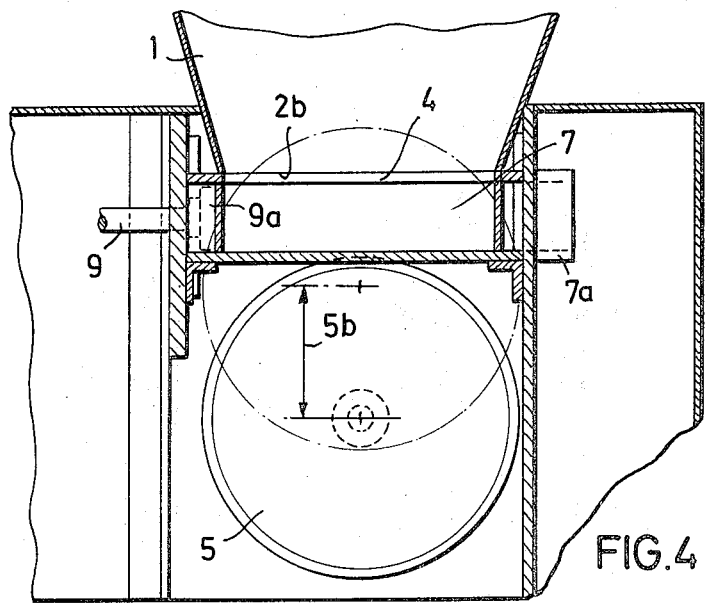
FIG. 4 is a section taken on line IV—IV of FIG. 1.

A cutter blade 5 is provided which can be inserted into and withdrawn from the space between the chamber 2 and the channel 7, alongside the open side of the latter which faces the chamber 2. As FIG. 4 shows it is advantageous if the dimension of the blade 5 is so selected than when the blade is in its final cutting position as indicated in the broken lines in FIG. 4, it will completely close off the channel 7 from the chamber 2. Advantageously, but not necessarily the blade 5 will be a circular blade mounted for rotation and being motor driven, as well as being displaceable in a vertical plane. The blade 5 in this embodiment is mounted on a drive shaft 5a which is driven in known manner with a known drive, for instance an electromotor. Advantageously it is mounted in a vertically displaceable not illustrated carriage in such a manner that the blade 5 is displaceable vertically in the direction of the arrow 5b between two positions in the one of which (here the lowest one) the channels 7 is completely open towards the chamber 2, whereas in the other one of which (here the upper one) the channel 3 is completely closed off from the chamber 2 as shown in FIG. 3.

In addition, the novel cutting device is provided with a second pusher element 9 having a plate 9a which can be pushed into the channel 7 over the entire or substantially the entire length of the latter. Advantageously the element 9 is also driven by a separate hydraulic drive unit, analogous to the drive for the element 6 and therefore not separately illustrated. At the free open end remote from that at which the element 9 enters the channel 7, the latter is provided with a connecting portion 7a to which a known cutting device can be connected so that foodstuffs expelled from the channel 7 will enter directly into this known cutting device which will then cube, dice, slice or otherwise subdivide the foodstuffs.

It will be appreciated that when large pieces of soft foodstuffs, such as meat, bacon or the like, are introduced into the hopper 1 these pieces will fall into the chamber 2 when the element 6 is in the position shown in FIG. 1. With the cutter blade 5 in its lowest position, the element 6 is now moved into the chamber 2 towards the channel 7, until it reaches the position shown in FIG. 3. During this movement the member 8 prevents additional foodstuffs from falling out of the hopper 1 into the chamber 2 behind the member 6. The inclination of the contact face of the member 6 assures that the foodstuffs in the chamber 2 are reliably engaged and displaced into the channel 7 until the latter is filled. Thus, the channel 7 can be completely filled with the foodstuff whereas excess foodstuffs can yield through the broad gap between the upper edge of the member 6 and the opposite lower edge of the hopper 1 or the edge 2b at the left end of the chamber 2 or the frame-shaped member 4 in upward direction, so that the foodstuffs are not excessively strongly squeezed and thereby damaged. With the channel 7 now completely filled with a quantity of the foodstuffs, the cutter blade 5 is rotated and simultaneously displaced vertically upwardly through the distance indicated by the arrow 5b, so that the quantity of foodstuff in the channel 7 is now severed from the foodstuff remaining in the chamber 2.

The quantity of foodstuff which has now been separated in the channel 7 from the remainder of the foodstuff in the chamber 2 has a clearly defined configuration which will always be the same for every such quantity. Thus, when it is subsequently subjected to further subdivision, all cubes, strips, slices or the like which are cut from it will be of uniform configuration.

The blade 5 is retained in its upper cutting position and the element 9 is operated so as to push the severed quantity of foodstuff out of the channel 7 and to expel it through the outlet 7a. To prevent the foodstuffs during entry from the chamber into the channel 7 from being snagged on the edge 2b, the latter is either inclined or rounded. During the operation of the element 9, the element 6 can be retracted to its starting position shown in FIG. 1, so that additional foodstuffs can fall out of the hopper 1 into the chamber 2. It is now merely necessary to retract the element 9 and the cutter blade 5 to their starting positions and the operation can begin again.

All of the displacements of the movable parts can be controlled mechanically, hydraulically, electrically or in other suitable manner, and the necessary control can be effected manually by an operator or it can be carried out partially or fully automatically.

To improve the appearance of the device and to aid in maintaining it clean the entire device is surrounded by a housing 3 from which essentially only the hopper 1 extends outwardly. Naturally the housing 3 may be provided with removable panels, with doors or the like to facilitate access to the interior for cleaning purposes, and that various components such as the hopper 1 can be made removable, or displaceable by tilting or the like.

Figure 5:
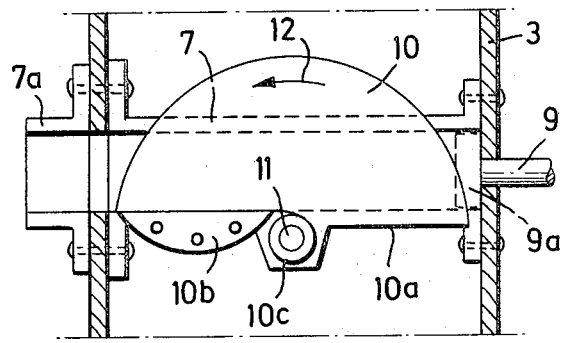
FIG. 5 is a view similar to FIG. 4 but illustrating a different cutter blade in its end position.
Figure 6:
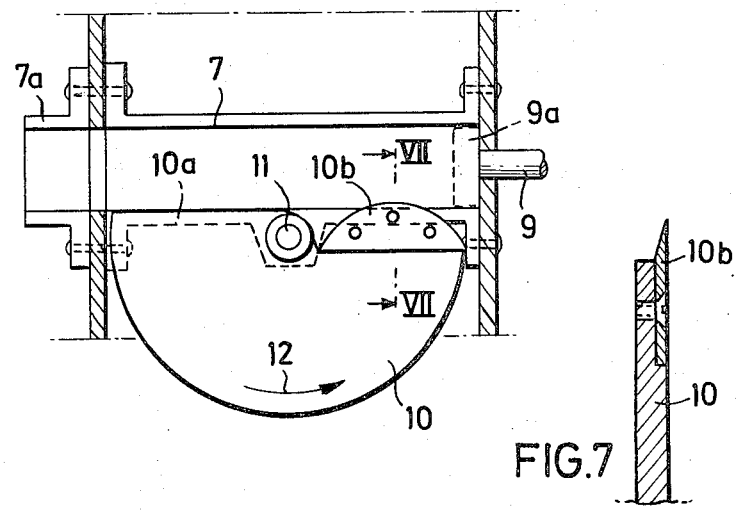
FIG. 6 is a view similar to FIG. 5 showing the cutter blade in its starting position.
Figure 7:
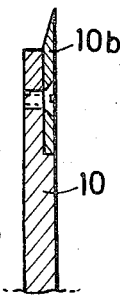
FIG. 7 is a section taken on line VII—VII of FIG. 6 and showing a detail of that Figure.

The embodiment in FIGS. 5-7 is essentially the same as that of FIGS. 1-4, except that it utilizes a differently configurated cutter blade. In this embodiment, in which like reference numerals identify like components as before, the cutter blade is designated with reference numeral 10 and configurated as a semi-circular plate which is pivotable about an axis 11, the latter being arranged near to the channel 7. The plate has a hub 10c which is mounted on the axle 11 and it is further provided with an edge corresponding approximately to a semi-circular configuration and having a cutting edge 10b whereas the other edge 10a may be blunt or may also be provided with a cutting edge.

In all other respects the device of FIGS. 5-7 corresponds to that of FIGS. 1-4.

In this embodiment, and while the element 6 is advanced, the plate 10 is in the position shown in FIG. 6. As soon as the channel 7 is filled with foodstuff, the cutter blade 10 is pivoted in the direction of the arrow 12 through 180°, and during such movement the cutting edge 10b severs the foodstuff in the channel 7 from the foodstuff in the chamber 2. Then the further operations are carried out as described with respect to the embodiment of FIGS. 1-4. It should be noted that in the embodiment of FIGS. 5-7 the blade 10 is also so constructed that when it is in its final cutting position shown in FIG. 5 it completely separates the interior of the channel 7 from the chamber 2, for the reasons outlined earlier.

Thus, it will be seen that the cutting device according to the present invention achieves the intended purposes and is capable of supplying the uniform cut-offs from larger pieces of soft foodstuffs, such as meat, bacon or the like, which cut-offs when further subdivided will due to their uniformity yield uniformly dimensioned smaller pieces.

It will be understood that each of the elements described above, or two or more together, may also find a useful application in other types of constructions differing from the types described above.

While the invention has been illustrated and described as embodied in a cutting device for large pieces of soft foodstuffs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A cutting device for large pieces of soft foodstuffs, such as meat, comprising wall means defining a chamber having a top and two transversely spaced sides, and an elongated discharge channel extending along one of said sides in open communication with said chamber and having a first and a second open end; a feed hopper above said chamber and having an outlet communicating with said top; a first pusher element mounted for movement beneath said outlet from the region of the other of said sides towards said one side, so as to push foodstuffs admitted through said outlet into said channel; a cutter blade movable into and out of position alongside said channel so as to sever the foodstuff in the latter from the foodstuff in said chamber; and a second pusher element movable in said channel longitudinally thereof between a first position in which it is located closer to said first end of said channel and permits admittance of foodstuffs into said channel and a second position in which it is located closer to said second end of said channel, so as to eject severed foodstuffs from said channel through said second end thereof.

2. A device as defined in claim 1, said first pusher element having an exposed contact face which is slanted upwardly towards said outlet and forwardly in direction toward said channel.

3. A device as defined in claim 1, said first pusher element having an exposed contact face provided with an upper edge facing said outlet, and a contact member provided on said upper edge and in sliding contact with an edge portion of said hopper which bounds said outlet.

4. A device as defined in claim 3, wherein said first pusher element is mounted for movement from the other of said sides to a position intermediate said sides so that said contact member only partially closes said outlet when said first pusher element is in said position.

5. A device as defined in claim 1; further comprising fluid-powered moving means for moving said pusher elements.

6. A device as defined in claim 5, said moving means comprising two hydraulic drives each associated with one of said pusher elements.

7. A device as defined in claim 1, said chamber also having a bottom wall; and wherein said outlet has a cross-sectional area substantially equal to the surface area of said bottom wall.

8. A device as defined in claim 7, wherein said outlet is of rectangular outline.

9. A device as defined in claim 1, wherein said cutter blade is so dimensioned as to separate said channel from said chamber when it is in position alongside said channel.

10. A device as defined in claim 1, said cutter blade having a rotatable circular blade movable in a substantially vertical plane; and further comprising motor means for at least rotating said circular blade.

11. A device as defined in claim 1, said cutter blade comprising a semi-circular plate, means mounting said plate for pivotal movement, and a cutting edge extending along at least one semi-circular edge of said plate.

* * * * *